April 12, 1960
R. A. KRAFT
2,932,766
TELEVISION RECEIVER
Filed March 23, 1959
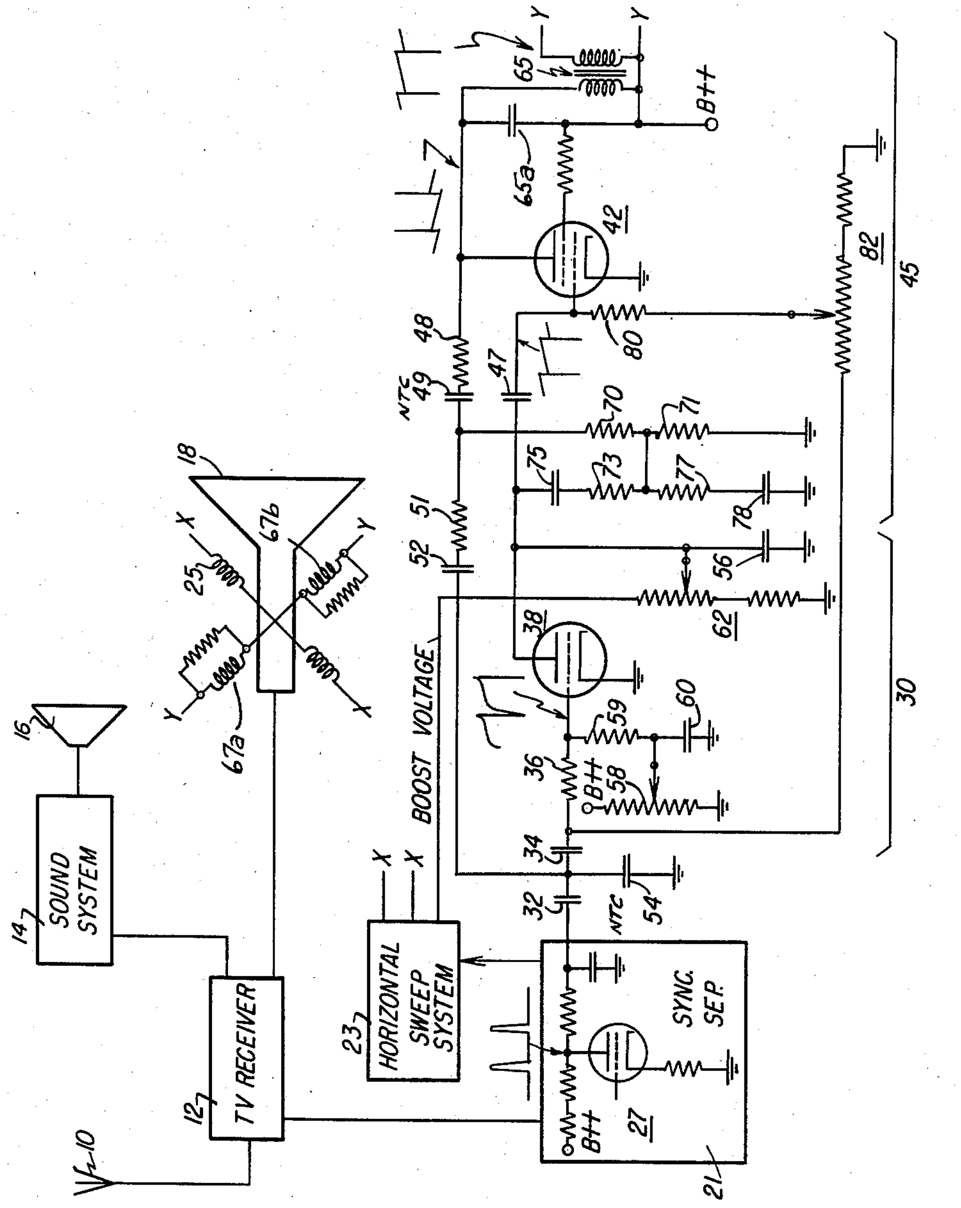
INVENTOR.
Richard A. Kraft
BY Mueller & Aichele
Attys.

United States Patent Office 2,932,766

Patented Apr. 12, 1960

2,932,766

TELEVISION RECEIVER

Richard A. Kraft, Elmhurst, Ill., assignor to Motorola, Inc., Chicago, Ill., a corporation of Illinois Application March 23, 1959, Serial No. 801,401

10 Claims. (Cl. 315—27)

This invention relates to cathode ray beam sweep circuits as used in television receivers to deflect the beam in the picture tube and more particularly to temperature compensation of such circuits. This is a continuation-in-part of my copending application Serial No. 676,838, filed August 7, 1957, now abandoned.

In the present state of the television art the magnetic deflection yokes used to provide horizontal and vertical deflection of the cathode ray beam are operated at temperatures as high as 90° C., or more. However, as the deflection yoke temperature rises, its resistance increases considerably and this commonly causes an impairment of the vertical linearity, generally at the top of the picture, as well as reduction of the vertical size, generally most noticeable at the bottom of the picture. This increase of yoke resistance with temperature causes a less efficient production of signals so that the output deflection signal is of insufficient magnitude and it further causes a change in damping of the yoke and output transformer circuit thus adversely affecting the linearity.

It is an object of this invention to overcome the tendency for loss of linearity and reduction of picture size due to increase in temperature of the deflection yoke and to do so in a simple and inexpensive manner.

Another object is to render a deflection effect of a cathode ray beam independent of a change in resistance of an associated deflection yoke, when such change in resistance is brought about as a result of a temperature change of the yoke.

Another object of the invention is to maintain vertical size and linearity in a television receiver by the expedient of using negative temperature coefficient capacitors in the vertical deflection circuit.

A feature of the invention is the provision of a multivibrator system for vertical sweep in a television receiver wherein the drive of the vertical output stage is increased and the bias of the stage is increased upon an increase in deflection yoke temperature, and thus a rise of the yoke resistance, to maintain desired vertical size and linearity.

Another feature is the provision of an improved vertical sweep system using a negative temperature coefficient capacitor in an inverse feedback path of the vertical output tube for reducing such feedback to increase the drive of this tube when the yoke temperature rises and raises the temperature of such capacitor.

A still further feature is the provision of such a vertical sweep system which utilizes a negative temperature coefficient capacitor in heat transfer relation with the deflection yoke and coupled into a bias developing circuit of the vertical oscillator, which circuit also provides bias for the vertical output tube, in order to maintain vertical linearity as the yoke temperature rises.

Further objects, features and the attending advantages of the invention will be apparent upon consideration of the following description when taken in conjunction with the accompanying drawing in which the figure shows a diagram of a television receiver utilizing the vertical sweep system of the invention.

The invention provides a cathode ray beam deflection system which maintains a deflection signal of desired magnitude and wave shape upon a change in the resistance of the deflection yoke which the sweep system energizes. As used in a vertical deflection system of a television receiver, this effectively maintains the vertical picture size and the linearity during a change in temperature of the yoke. In a preferred form of the invention two negative temperature coefficient capacitors are used and these are placed in heat transfer relationship with the yoke and have particular capacitor values and temperature coefficients. One capacitor is coupled in an inverse feedback path of the vertical output stage, which stage in combination with an oscillator stage forms a multivibrator. With the negative temperature coefficient capacitor in series with this feedback path and a rise in the feedback voltage due to increase of yoke temperature, the impedance of this condenser increases to reduce the feedback, thus increasing the drive of the vertical output tube to maintain size. The other capacitor is connected in the input circuit for the vertical oscillator stage. This stage develops a bias voltage due to conduction upon feedback of the output pulses of the vertical sweep system. As the impedance of this capacitor increases with an increase in temperature thereof, a larger bias is developed and this bias is applied to the vertical output tube as a bias for maintaining the linearity of the signal in this stage.

Fig. 1 shows a television receiver utilizing the invention. Antenna 10 is connected to a conventional superheterodyne television receiver 12 which provides detection of the sound signal which is applied to the sound system 14 for demodulation and energization of speaker 16. Receiver 12 also provides recovery of the video portion of the television signal and this is applied to the cathode ray picture tube 18. Synchronizing components of the television signal are applied to a sync separator 21 which controls the horizontal sweep system 23, providing horizontal deflection of the cathode ray beam through energization of the horizontal yoke winding 25.

Sync separator 21 includes a clipper stage 27 which applies positive pulses to the vertical oscillator stage 30 for synchronizing the vertical deflection of the cathode ray beam with the vertical or frame sync information. These positive going pulses are applied through blocking capacitor 32, series input capacitor 34 and isolating resistor 36 to the grid of triode oscillator tube 38. This causes conduction of tube 38 and cutoff of vertical output tube 42 in the vertical output circuit 45. The anode of tube 38 is coupled through blocking capacitor 47 to the control grid of tube 42 and when tube 38 is conductive this lowers the voltage at the control grid of tube 42 causing cutoff thereof and an increase in its anode potential. The rise in anode potential of tube 42 is coupled to the grid of tube 38 by way of a positive feedback path including a series connected R–C network comprising resistor 48, capacitor 49, resistor 51 and capacitor 52. This positive going pulse is applied to the junction of blocking capacitor 32 and input capacitor 34 and across the shunt input capacitor 54. Through this regenerative action the conduction of tube 38 is increased. The sawtooth capacitor 56 is coupled across the anode and cathode of tube 38 and this capacitor is discharged as this tube is conductive. A static bias is applied to the grid of tube 38 by means of a hold control potentiometer 58 which is connected between ground a source of positive potential. The variable arm of potentiometer 58 is connected through an input resistor 59 to the grid of tube 38 and the arm is bypassed through condenser 60 which is connected to ground.

Due to the tuned circuit effect of the transformer 65 (together with yoke inductance) and the associated capacitor 65a connected to the anode of tube 42, the voltage through feedback path 48—52 rises above B++ and then swings downward toward B++ during the flyback time and this causes cutoff of tube 38 so that sawtooth capacitor 56 may again charge through size control potentiometer 62. This potentiometer is connected between ground and a source of high voltage, or boost voltage, in the horizontal sweep system 23. Charge of capacitor 56 increases the potential on the control grid of tube 42 thus rendering it conductive and lowering its anode potential to further the cutoff action of tube 38. The voltage swing at the anode of tube 42, due to the tuned circuit effect of transformer 65 and its associated capacitor 65a, actually causes a reverse current through the yoke and this tuned circuit is damped by various shunt paths in the vertical output stage so that as the current wave form begins to rise again, the damping of the circuit retards this rise and tube 42 commences to conduct and to contribute to the first portion of the sawtooth deflection signal. Accordingly, as capacitor 56 continues to charge, tube 42 conducts through the primary of transformer 65. The secondary winding of transformer 65 is connected across the series connected vertical deflection yoke windings 62a and 62b.

The bias on the control grid of the vertical output tube 42 is established through input resistor 80 which is connected to the arm of linearity control potentiometer 82. This potentiometer is connected between ground and a junction of capacitor 34 and resistor 36 in the vertical oscillator stage. Accordingly, a portion of the bias developed by tube 38 is applied as a bias to tube 42. The linearity is established by proper biasing of tube 42 so that it commences conduction to contribute to the yoke current at the time when the tuned effect of transformer 65 and capacitor 65a causes a reverse current at the beginning of the vertical trace. Thus, by properly regulating the tube conduction and the time when it conducts with respect to the swing of the output wave form, satisfactory linearity at the start of the sweep signal may be obtained.

Since the deflection yoke windings include some inductive reactance, it is necessary to modify the sawtooth wave form provided by the output circuit 45 in order to obtain a proper linear deflection of the cathode ray beam. To accomplish this, a portion of the output signal from the anode of tube 42 is fed back through an inverse or negative feedback path to the grid of this tube. This path is through resistor 48, capacitor 49 and resistor 70 which apply a signal across resistor 71 from the output tube 42. The signal appearing across resistor 71 also appears across series connected resistor 77 and capacitor 78 and the wave form developed by this network is applied to the control grid of tube 42 by way of resistor 73, capacitor 75 and blocking capacitor 47.

As previously indicated, during operation of the system, yoke winding 67a and 67b become quite warm thus causing an increase in the resistance of the windings. As an example of this effect in one given television receiver it was found that as the temperature rose 30° C. the yoke resistance increased 5 ohms and the vertical reduction of picture size was of the order of ⅜ of an inch; as the yoke temperature increased 60° C. the yoke resistance increased 10 ohms and the picture size was reduced by ¾ of an inch; and as the temperature of the yoke rose 90° C. the yoke resistance increased by 15 ohms and the picture size reduction was over 1 inch. Such an increase in the yoke resistance is reflected back through the output circuit of tube 42 by way of transformer 65 which causes adverse effects on vertical size as well as a loss of linearity. Loss of size may be said to occur through a reduction of output efficiency which can result from an increase voltage output signal which is fed back through the inverse feedback path by way of components 48, 49, 70, 73, 75 and 47 to decrease the drive of tube 42. The loss of linearity occurs to a first order extent because of a reduced damping of the tuned circuit provided by transformer 65 and capacitor 65a when the yoke resistance increases and thereby permits a greater reverse swing of the current wave form developed at the start of the picture trace. This change in damping of the output and yoke circuit results in an expansion at the top of the picture. It may also be further distorted by an improper matching of the commencement of the conduction of tube 42 with the output current signal due to the tuned circuit 65, 65a. To afford satisfactory correction of the above described difficulties, capacitors 49 and 54 have negative temperature coefficients and are in heat conductive relation with the yoke windings 67a and 67b, the following description giving a more detailed account of the circuit operation under such conditions.

Since most television receivers are enclosed in cabinets wherein the physical placement of the components is fixed, the heat exchange of the various components can be determined during a period of operation of the receiver. Accordignly, it can be determined that the temperature rise within the cabinet of the television receiver follows a pattern resembling that of the temperature rise occurring in the yoke windings 67a and 67b. In a particular model television receiver it was found that during the first 25 minutes of operation of the receiver the yoke coils rose in temperature by approximately 25° C. whereas the cabinet temperature increased by approximately 12° C. Between 25 and 75 or more minutes of operation of the receiver, the yoke winding increased in temperature by a maximum of approximately 45° whereas the cabinet temperature rose to a maximum of 24° C. It was then determined what change in capacity of condensers 49 and 54 was necessary to maintain vertical size and linearity during use of the television receiver, taking into account the rise of temperature of the yoke and the heat conductive relation between these capacitors and the yoke. Thus capacitors of the proper negative temperature coefficient can be placed in the circuit in heat conductive relation with the yoke.

During operation of the receiver it may be noted that as the yoke is heated and capacitor 49 is heated, its capacity will decrease thereby raising its impedance in the inverse feedback path from the anode of tube 42 through resistor 48, capacitor 49, resistor 70, resistor 73, capacitor 75 and capacitor 47, thus decreasing the amount of feedback therethrough and effectively increasing the drive on tube 42 so that increased output is developed to properly maintain vertical size.

As capacitor 54 also rises in temperature due to its heat conductive relation with the deflection yoke, its impedance will increase so that a larger positive feedback signal is developed between the grid and cathode of tube 38. This signal is applied by the way of resistor 48, capacitor 49, resistor 51 and capacitor 52. Accordingly, as the impedance of capacitor 54 increases, a larger negative bias is developed at the grid of tube 38 through charging of the capacitors in its input circuit, and this bias is applied from the junction of capacitor 34 and resistor 36 to one side of linearity control potentiometer 82. As previously explained, a portion of this negative bias is coupled through resistor 80 to the grid of tube 42. As a larger bias is developed it delays the conduction time of tube 42 and the conduction thereof is timed during the early portion of the scanning cycle so that more of the scanning signal at that portion of the scan is delivered by the signal developed by tuned circuit 65, 65a and less by tube 42 to maintain the output wave form. Compensation is thus provided for the decreased damping effect which an increase in yoke resistance has on the tuned circuit 65, 65a.

In a constructed embodiment of the invention, circuit constants of the following values were utilized:

| | |
|---|---|
| Capacitor 32 | .002 microfarad. |
| Capacitor 34 | .007 microfarad. |
| Resistor 36 | 18,000 ohms. |
| Tube 38 | ½-6CG7. |
| Tube 42 | 5AQ5. |
| Capacitor 47 | .02 microfarad. |
| Resistor 48 | 22,000 ohms. |
| Capacitor 49 | .02 microfarad (with a capacity decrease of 22% over the temperature range of 24–48° C.) |
| Resistor 51 | 22,000 ohms. |
| Capacitor 52 | .015 microfarad. |
| Capacitor 54 | .0033 microfarads (with an 11% decrease in capacity over a temperature variation from 24° to 48° C.) |
| Capacitor 56 | .01 microfarad. |
| Potentiometer 58 | 3 megohms (with a stop one megohm from ground). |
| Resistor 59 | 5.6 megohms. |
| Capacitor 60 | .01 microfarad. |
| Potentiometer 62 | 5 megohms (with a stop one megohm from ground). |
| Capacitor 65a | .001 microfarad. |
| Resistor 70 | 18,000 ohms. |
| Resistor 71 | 180,000 ohms. |
| Resistor 73 | 15,000 ohms. |
| Capacitor 75 | .05 microfarad. |
| Resistor 77 | 8,200 ohms. |
| Capacitor 78 | .05 microfarad. |
| Potentiometer 82 | 2 megohms (with 220,000 ohms between the ground side of the potentiometer and ground). |

It is also possible to increase the drive of tube 42, in order to maintain vertical size upon temperature change of the deflection yoke, by using a capacitor having a negative temperature coefficient for capacitor 75. Then upon increase of the temperature of this capacitor, and consequent decrease in its capacity, the sawtooth wave form applied from tube 38 to the input of tube 42 would be increased since capacitor 75 affects the formation of the sawtooth wave form developed by its network. Capacitor 54 may then also have a negative temperature coefficient in order to maintain linearity while capacitor 75 compensates for size change. However, in a circuit of this type it may also be necessary that capacitor 34 be of a negative temperature coefficient type in order to prevent a drift of sweep frequency as the size of capacitor 54 changes. It should be noted that a tendency for frequency drift in the previously described circuit, using negative temperature coefficient capacitors for capacitors 49 and 54, is avoided by the self-compensating action between these capacitors. That is, a frequency change which tends to be caused by an increase of the feedback signal level applied to tube 38, due to the decrease in capacity of capacitor 54, is offset by the decrease in pulse feedback amplitude through network 48—52 in which capacitor 49 decreases in value. Accordingly, the first described circuit requires but two special capacitors whereas the modified circuit utilizes three such capacitors to achieve the completely satisfactory result.

As a further circuit modification it may be seen that a negative temperature coefficient capacitor could be inserted on either side of resistor 70 which would thus place this capacitor in the negative feedback path for the tube 42 in order to increase the drive of the tube by reduction of negative feedback upon temperature increase of the yoke. In this instance it should also be recognized that if capacitor 54 has a negative temperature coefficient to compensate for linearity change, it may also be necessary that capacitor 34 have a negative temperature coefficient in order to maintain frequency stability, which may deteriorate without a negative temperature coefficient capacitor in the feedback path 48—52 as previously described.

This invention provides automatic compensation in a cathode ray beam deflection circuit for the effects of changes in yoke temperature. It may be noted that preferred practice of the invention requires only two negative temperature coefficient capacitors in addition to the usual components required in a vertical deflection circuit and that the circuit is therefore simple and inexpensive. Furthermore, it should be pointed out that corrections for both size and linearity are automatically introduced to maintain desired operation of the vertical circuit during yoke temperature changes.

I claim:

1. A sweep signal generator system adapted to be coupled to a deflection yoke of a television receiver, said system including in combination, electron valve means, and circuit means coupling said valve means as a sweep signal generator, said circuit means including an inverse feedback path for said valve means with a first negative temperature coefficient capacitor series coupled therein to reduce the inverse feedback upon increase in temperature thereof, said circuit means also including a bias developing circuit for said valve means in which the bias is proportional to the level of the output signal of said valve means, said bias developing circuit including a second negative temperature coefficient capacitor across which a portion of such output signal is developed for causing a change in the bias proportional to a change in the temperature of said second capacitor, said first and second capacitors being adapted to be positioned in heat transfer relation with the deflection yoke for maintaining the current therein substantially uniform with change in temperature thereof.

2. A cathode ray tube sweep system adapted to produce an output signal for energizing a deflection yoke to produce a deflection effect upon a cathode ray beam, and wherein the yoke is subject to increase in temperature and resistance, said system including in combination, first and second electron discharge devices, circuit means coupling said first and second discharge devices in cascade as a multi-vibrator, said circuit means including an inverse feedback path for said second electron discharge device, said inverse feedback path including a first capacitor series coupled therein, said circuit means also including a resistor capacitor network connected from said second discharge device to said first discharge device to apply positive feedback signals to said first discharge device so that the same is rendered conductive thereby to develop a bias potential, said resistor capacitor network including second capacitor means across which the positive feedback signals are developed, and a direct current path from said resistor capacitor network to control the bias of said second discharge device and the linearity of the deflection effect, said first and second capacitors each having negative temperature coefficients and being positioned in heat transfer relation with the deflection yoke for reducing the inverse feedback and increasing the bias potential upon rise in the yoke temperature thereby tending to maintain established yoke current with a change in temperature thereof.

3. A cathode ray tube sweep system adapted to produce an output signal for energizing a magnetic deflection yoke with a current of desired wave shape, which deflection yoke has a resistance subject to change upon increase in temperature thereof, said system including in combination, first and second electron discharge devices having respective input and output elements, circuit means coupling said first and second discharge devices in cascade as a multi-vibrator, said circuit means including an inverse feedback path coupled between said output element and said input element of said second discharge device, said inverse feedback path including a first capacitor series coupled therein, said circuit means also including a resistor-capacitor network connected from said second discharge device to said input element of said first discharge device to apply positive feedback signals to said first discharge device so that the same is rendered conductive thereby to develop a bias potential, said resistor-capacitor network including second capacitor means across which the positive feedback signals are developed at said input electrode of said first discharge device, and a direct current path from said input element of said first discharge device to said input element of said second discharge device to apply the bias potential thereto, said first and second capacitors each having negative temperature coefficients and being positioned in heat transfer relation with the deflection yoke for reducing the inverse feedback and increasing the bias potential upon rise in the yoke temperature thereby tending to maintain the yoke current of desired wave shape with a change in temperature thereof.

4. A cathode ray tube sweep system adapted to produce an output signal for energizing a magnetic deflection yoke with a current of desired wave shape, which deflection yoke has a resistance subject to change upon increase in temperature thereof, said system including in combination, electron valve means having input and output elements, circuit means couping said valve means as a source of sweep signals, said circuit means including an inverse feedback path coupled between said output element and said input element, said inverse feedback path including a capacitor series coupled therein, said capacitor having a negative temperature coefficient and being positioned in heat transfer relation with the deflection yoke for reducing the inverse feedback upon rise in the yoke temperature thereby tending to maintain the yoke current of desired wave shape with a change in temperature thereof.

5. A cathode ray tube sweep system adapted to produce an output signal for energizing a magnetic deflection yoke with a current of desired wave shape, which deflection yoke has a resistance subject to change upon increase in temperature thereof, said system including in combination, electron valve means having input and output elements, circuit means coupling said valve means as a sweep generator, said circuit means including a resistor-capacitor network connected from said output element to said input element to apply positive feedback signals to said valve means so that the same is rendered conductive thereby to develop a bias potential, said resistor-capacitor network including capacitor means across which the positive feedback signals are developed at said input electrode, and a direct current circuit for said input element of said discharge device to apply the bias potential thereto, said capacitor having a negative temperature coefficient and being positioned in heat transfer relation with the deflection yoke for increasing the bias potential upon rise in the yoke temperature thereby tending to maintain the yoke current of desired wave shape with a change in temperature thereof.

6. A cathode ray tube sweep system adapted to produce an output signal for energizing a magnetic deflection yoke with a current of desired wave shape, and wherein the yoke has a resistance subject to change upon increase in temperature thereof, said system including in combination, first and second electron discharge devices having respective input and output elements, circuit means coupling said first and second discharge devices in cascade as a multi-vibrator, said circuit means including a signal coupling path from said output element of said first discharge device to said input element of said second discharge device, an output circuit coupled to said output element of said second discharge device including tuned circuit means for applying current of desired wave form to the deflection yoke, said output circuit having a portion including a series coupling capacitor for applying positive feedback to said input electrode of said first discharge device, an inverse feedback circuit coupled between said input and output elements of said second discharge device for modifying the wave form at said input element of said second discharge device, said inverse feedback circuit including said coupling capacitor, a resistor-capacitor network coupled to said input electrode of said first discharge device for self-biasing thereof as the feedback signals are applied thereto through said signal coupling path, said resistor-capacitor network including an input capacitor across which the feedback signals are developed to be impressed on said first discharge device, and a direct current path from said input element of said first discharge device to said input element of said second dishcarge device to impress a portion of the bias potential on said second discharge device as a control of linearity of the output signal, said coupling capacitor and said input capacitor each having respective negative temperature coefficients and being adapted to be positioned in heat transfer relation with the deflection yoke, the values of said coupling capacitor and said input capacitor and the temperature coefficients thereof being selected to cause the bias on said second discharge device to change directly with a resistance change of the deflection yoke and the inverse feedback to said second discharge device to change inversely with a change of resistance of the deflection yoke for maintaining the yoke current at substantially the desired wave form upon temperature change thereof.

7. A cathode ray tube sweep system adapted to produce an output signal for energizing a magnetic deflection yoke, and wherein the yoke has a resistance subject to change upon increase in temperature thereof, said system including in combination, first and second electron discharge devices having respective input and output elements, circuit means coupling said first and second discharge devices in cascade as a multi-vibrator, said circuit means having a signal path including a series coupling capacitor for applying positive feedback signals to said input electrode of said first discharge device from said output element of said second discharge device, said circuit means also having an inverse feedback circuit coupled between said input and output elements of said second discharge device for modifying the wave form at said input element of said second discharge device, said inverse feedback circuit including said coupling capacitor, a resistor-capacitor network coupled to said input electrode of said first discharge device for self-biasing thereof as the feedback signals are applied thereto through said signal path, said resistor-capacitor network including an input capacitor across which the feedback signals are developed to be impressed on said first discharge device, and a direct current path from said input element of said first discharge device to said input element of said second discharge device to impress a portion of the bias potential on said second discharge device as a control of linearity of the output signal, said coupling capacitor having a negative temperature coefficient such that the capacity thereof decreases 22% upon temperature rise from 24° C. to 48° C., and said input capacitor having a negative temperature coefficient such that the capacity thereof decreases of the order of 11% upon temperature rise from 24° C. to 48° C., said input and coupling capacitors being adapted to be positioned in heat transfer relation with the deflection yoke, whereby the energization level of said yoke and the linearity of deflection effect thereof are maintained during temperature change of the yoke.

8. A sweep system adapted to be coupled to a deflection yoke of a television receiver to energize the same with sweep signals, said system including in combination, first and second electron discharge devices, and circuit means coupling said discharge devices as a multi-vibrator, said circuit means including an input circuit for said second discharge device with a first negative temperature coefficient capacitor coupled therein to increase the drive of said second discharge device upon increase in temperature of said first capacitor, said circuit means also including a bias developing circuit for said first and second discharge devices in which the bias is proportional to the level of the output signal of said second discharge device, said bias developing circuit including a second negative temperature coefficient capacitor across which a portion of such output signal is developed for causing a change in the bias proportional to a change in the temperature of said second capacitor, said bias developing circuit further including a series connected input capacitor for said first discharge device across which at least a portion of said bias is developed, said input capacitor having a negative temperature coefficient, said first, second and input capacitors being adapted to be positioned in heat transfer relation with the deflection yoke for maintaining the current therein and the frequency of the sweep signals substantially uniform with change in temperature thereof.

9. A cathode ray tube sweep system adapted to produce an output signal for energizing a magnetic deflection yoke with a current of desired wave shape, which deflection yoke has a resistance subject to change upon increase in temperature thereof, said system including in combination, an electron discharge device having input and output elements, circuit means coupled to said input element to apply sweep control signals thereto, said circuit means including a negative temperature coefficient capacitor therein coupled to increase the amplitude of the sweep control signals as the temperature of said capacitor increases, said capacitor being positioned in heat transfer relation with the deflection yoke for increasing the drive of said discharge device upon rise in the yoke temperature thereby tending to maintain the yoke current of desired wave shape with a change in temperature thereof.

10. A cathode ray tube sweep system adapted to produce an output signal for energizing a magnetic deflection yoke with a current of desired wave shape, which deflection yoke has a resistance subject to change upon increase in temperature thereof, said system including in combination, electron valve means having input and output elements, circuit means coupling said valve means as a generator of sweep signals, said circuit means including signal amplitude determining capacitor means coupled to said valve means, at least a portion of said capacitor means having a negative temperature coefficient and being positioned in heat transfer relation with the deflection yoke for increasing the output signal upon rise in the yoke temperature thereby tending to maintain the yoke current of desired wave shape with a change in temperature thereof.

No references cited.